No. 800,811. PATENTED OCT. 3, 1905.
C. F. MARTIN.
VETERINARY TOOTH CUTTER OR DENTAL FLOAT.
APPLICATION FILED APR. 27, 1905.
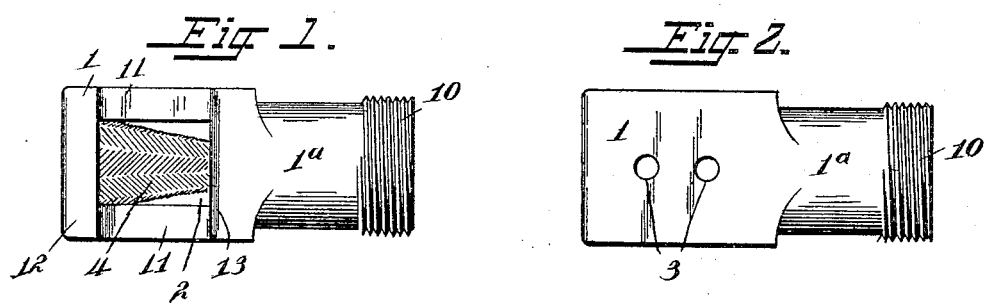
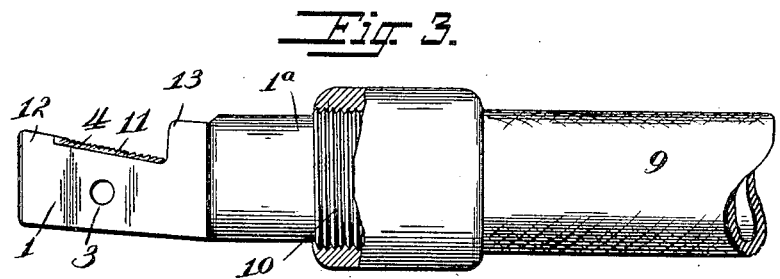
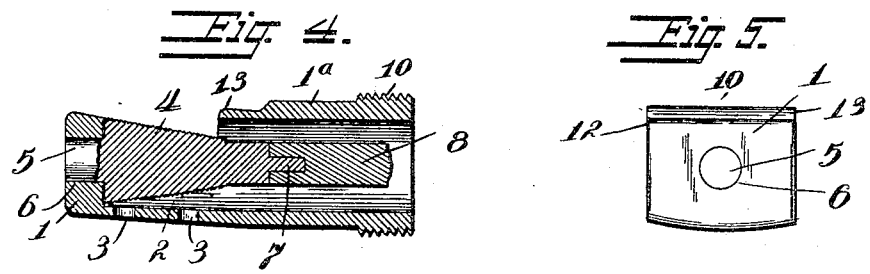
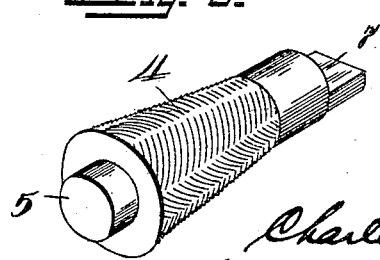
Witnesses
Milton C. Lenoir
Geo. H. Hawkins
Inventor
Charles F. Martin
by Frank C. Goe
his Attorney

UNITED STATES PATENT OFFICE.

CHARLES F. MARTIN, OF EVANSVILLE, INDIANA.

VETERINARY TOOTH-CUTTER OR DENTAL FLOAT.

No. 800,811.      Specification of Letters Patent.      Patented Oct. 3, 1905.

Application filed April 27, 1905. Serial No. 257,664.

*To all whom it may concern:*

Be it known that I, CHARLES F. MARTIN, a citizen of the United States, residing at Evansville, county of Vanderburg, and State of Indiana, have invented certain new and useful Improvements in Veterinary Tooth-Cutters or Dental Floats, of which the following is a specification.

My invention relates to veterinary tooth-cutters or dental floats.

The object of the present invention is the provision of a veterinary tooth-cutter or dental float especially adapted for use on the front teeth of horses and one which will be simple, strong, inexpensive to manufacture, and efficient in operation, my object being particularly to provide a novel form of guard or holder to protect the gums and lips of the animal from laceration by the cutter by the employment of certain novel features of construction and to provide an improved cone-shaped cutter mounted in a novel manner in the guard or holder.

The invention embraces certain improved features of construction and novel combinations of parts set forth in detail hereinafter, and recited in the appended claims.

In the accompanying drawings, Figure 1 is a view looking toward the cutter; Fig. 2, a view of the reverse side of the holder or guard; Fig. 3, a side view; Fig. 4, a longitudinal section; Fig. 5, an end view, and Fig. 6 a detail of the cone-shaped cutter.

The metal holder 1 is provided with a chamber 2, from which lead openings 3 for the falling out of the cuttings, and in this chamber 2 is located a rotary cone-shaped cutter 4, which is provided with a reduced journal 5 at its larger end, said journal being received in a bearing 6 in the end of the holder. The other end of the cutter has a flattened portion 7, detachably engaged with any suitable flexible rotary operating-shaft 8, turning in a casing or tube 9, detachably engaged by screw-threads 10 with the tubular portion 1ª of the holder. The flexible shaft can be driven by any suitable motor or by hand.

The holder 1 is cut away on a slope or incline at 11 on opposite sides of the cutter 4 at approximately the same angle as the disposition of the surface of the cutter, so that the surface of the cutter projects above said inclined portions 11; but the outer end of the holder is raised at 12 to lie as high as the surface of the cutter to form a guard which prevents the cutter from injuring the gums or lips of the animal when being placed in the mouth or when the device is in operation. The opposite ends of the inclines 11 terminate in an abrupt transverse guard 13, which by abutting the teeth of the animal on the outer surface thereof prevents the lips of the animal from being struck by the cutter and also holds the device properly gaged to the teeth.

In addition to the advantages gained by the employment of the guards 12 and 13 the provision of a cone-shaped cutter tends to cause a drawing action in the cutting operation, which assists in holding the guard 13 against the front of the teeth, thus better holding the tool to its work and achieving superior results, while by journaling the outer end of the rotary cutter it is made to run more steadily and with minimum vibration, as the flexible shaft constitutes the other bearing for the cutter.

Having thus described my invention, what I claim as new, and desire to secure by Letters Patent, is—

1. In a veterinary tooth-cutter or dental float, the combination with a holder having a chamber, of a cone-shaped cutter located in said chamber with a portion of its periphery projecting and being positioned with its larger end disposed toward the outer end of the holder.

2. In a veterinary tooth-cutter or dental float, the combination with a holder having a chamber, of a cone-shaped cutter located in said chamber with a portion of its periphery projecting and being positioned with its larger end disposed toward the outer end of the holder, and a transverse guard on the holder and toward the smaller end of the cutter, whereby the cutting action tends toward said guard.

3. In a veterinary tooth-cutter or dental float, the combination with a holder having a chamber, and a transverse guard at the outer end of said chamber, and also provided with cut-away portions located inwardly from said transverse guard, of a rotary cutter located in said chamber with a portion of its periphery projecting from said chamber but rising no higher than the guard aforesaid.

4. In a veterinary tooth-cutter or dental float, the combination with a holder having a chamber opening out through said holder and closed at the outer end of the holder, said outer end of the holder being provided with a raised guard, thence formed with lower portions extending inwardly of the holder and terminating in a transverse guard, of a rotary cutter located in the chamber and journaled at its outer end in the closed outer end of the chamber.

In testimony whereof I hereunto affix my signature in presence of two witnesses.

CHARLES F. MARTIN.

Witnesses:
    PERCY C. HOPKINS,
    T. T. COLMESNIL.